(12) United States Patent
Sanzone et al.

(10) Patent No.: US 9,569,362 B2
(45) Date of Patent: Feb. 14, 2017

(54) PROGRAMMABLE ORDERING AND PREFETCH

(71) Applicant: Cavium, Inc., San Jose, CA (US)

(72) Inventors: Robert A. Sanzone, Hudson, MA (US); Wilson P. Snyder, II, Holliston, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 156 days.

(21) Appl. No.: 14/540,379

(22) Filed: Nov. 13, 2014

(65) Prior Publication Data

US 2016/0139829 A1 May 19, 2016

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ......... *G06F 12/0862* (2013.01); *G06F 12/084* (2013.01); *G06F 12/0811* (2013.01); *G06F 12/0842* (2013.01); *G06F 2212/1008* (2013.01); *G06F 2212/602* (2013.01); *G06F 2212/6022* (2013.01); *G06F 2212/62* (2013.01)

(58) Field of Classification Search
CPC .............................. G06F 12/1081; G06F 13/12
USPC ........................................................ 711/122
See application file for complete search history.

(56) References Cited

U.S. PATENT DOCUMENTS

| | | | |
|---|---|---|---|
| 6,134,622 A | 10/2000 | Kapur et al. | |
| 6,226,704 B1* | 5/2001 | Wang | G06F 13/4036 370/402 |
| 6,401,192 B1* | 6/2002 | Schroter | G06F 9/383 711/137 |
| 6,412,030 B1* | 6/2002 | Adusumilli | G06F 13/1621 710/2 |
| 6,516,393 B1 | 2/2003 | Fee et al. | |
| 6,529,991 B1* | 3/2003 | Beukema | G06F 13/423 710/310 |
| 6,567,975 B1* | 5/2003 | Damron | G06F 8/4442 714/35 |
| 6,859,208 B1 | 2/2005 | White | |
| 7,124,252 B1* | 10/2006 | Khare | G06F 12/0831 710/39 |
| 7,613,850 B1* | 11/2009 | Doering | G06F 13/1621 710/36 |
| 8,601,223 B1 | 12/2013 | Yuan | |
| 8,661,458 B2 | 2/2014 | Sakai | |
| 8,832,415 B2 | 9/2014 | Gala et al. | |
| 9,032,162 B1 | 5/2015 | Chang et al. | |

(Continued)

*Primary Examiner* — Sheng-Jen Tsai (74) *Attorney, Agent, or Firm* — Hamilton, Brook, Smith & Reynolds, P.C.

(57) ABSTRACT

An input/output bridge controls access to a memory by a number of devices. The bridge enforces ordering of access requests according to a register storing an order configuration, which can be programmed to accommodate a given application. When suspending an access request as a result of enforcing an order configuration, the bridge may also cause a prefetch at the memory for the suspended access request. Subsequently, following the completion of a previous access request meeting the order configuration, the suspended access request is released. Due to the prefetch, an access operation can be completed with minimal delay.

22 Claims, 6 Drawing Sheets

(56) References Cited

U.S. PATENT DOCUMENTS

| | | | |
|---|---|---|---|
| 2002/0040429 A1* | 4/2002 | Dowling | G06F 9/30032 712/228 |
| 2002/0172199 A1 | 11/2002 | Scott et al. | |
| 2003/0126372 A1* | 7/2003 | Rand | G06F 12/0862 711/141 |
| 2003/0163649 A1* | 8/2003 | Kapur | G06F 12/0813 711/146 |
| 2003/0204679 A1* | 10/2003 | Blankenship | G06F 12/0835 711/146 |
| 2004/0064627 A1* | 4/2004 | Shah | G06F 13/4031 710/310 |
| 2007/0130372 A1* | 6/2007 | Irish | G06F 13/12 710/5 |
| 2008/0109565 A1* | 5/2008 | Ajanovic | G06F 1/3203 710/8 |
| 2008/0243768 A1* | 10/2008 | Freedman | G06F 17/30445 |
| 2008/0301256 A1 | 12/2008 | McWilliams et al. | |
| 2009/0234987 A1 | 9/2009 | Lee et al. | |
| 2010/0095032 A1* | 4/2010 | Harriman | G06F 13/1626 710/100 |
| 2011/0072218 A1* | 3/2011 | Manne | G06F 12/0862 711/136 |
| 2011/0219208 A1* | 9/2011 | Asaad | G06F 15/76 712/12 |
| 2011/0320743 A1* | 12/2011 | Hagspiel | G06F 12/0815 711/154 |
| 2011/0320892 A1* | 12/2011 | Check | G06F 11/0724 714/723 |
| 2012/0020210 A1 | 1/2012 | Sonnier et al. | |
| 2012/0173843 A1 | 7/2012 | Kamdar | |
| 2013/0103923 A1 | 4/2013 | Pan | |
| 2013/0132854 A1 | 5/2013 | Raleigh et al. | |
| 2013/0163481 A1 | 6/2013 | Ellison et al. | |
| 2013/0297906 A1 | 11/2013 | Loh et al. | |
| 2013/0346697 A1* | 12/2013 | Alexander | G06F 12/0811 711/122 |
| 2014/0123316 A1 | 5/2014 | Leggette et al. | |
| 2014/0201500 A1* | 7/2014 | Niell | G06F 15/7807 712/36 |
| 2014/0281197 A1* | 9/2014 | Niell | G06F 12/1027 711/105 |
| 2015/0278099 A1* | 10/2015 | Jain | G06F 12/0862 711/137 |
| 2016/0139806 A1 | 5/2016 | Sanzone et al. | |
| 2016/0140073 A1 | 5/2016 | Sanzone et al. | |

* cited by examiner

PROGRAMMABLE ORDERING AND PREFETCH

BACKGROUND

Certain interconnect or bus architectures, such as Peripheral Component Interconnect Express (PCIe), implement a predetermined set of rules for ordering access requests, such as memory reads and writes, to a memory. When enforcing ordering rules, some access requests are suspended until receiving an indication that a previous access request is completed. Under certain applications, enforcement of ordering rules can prevent conflicts between different access requests, for example by preventing out-of-order access to a common address of the memory.

SUMMARY

Example embodiments of the present disclosure include a circuit configured to control access to a memory by a number of devices. The circuit may include a register storing an order configuration, the order configuration indicating rules for ordering access requests. The circuit also includes a control circuit configured to manage access requests to the memory. The control circuit may enforce the rules for ordering access requests, as well as control prefetching for certain access request. In particular, the control circuit may forward a first access request to a memory and monitor the completion status of the first access request. When a second access request is received, the control circuit may selectively forward or suspend a second access request based on the order configuration and the completion status of the first access request. If the second access request is suspended, the control circuit may further forward a prefetch command to the memory to perform a prefetch for the second access request.

In further embodiments, the order configuration may indicate whether to enforce ordering among two or more sequential access requests based on a respective type of each of the sequential access requests. The respective types may include a memory read request (a "load" operation) and a memory write request (a "store" operation). The particular order configuration may be Peripheral Component Interconnect (PCI) order configuration or another standard order configuration. The PCI order configuration may be implemented in a configuration where the control circuit selectively forwards the access requests via a PCI memory bus. However, the circuit may, alternatively, implement an order configuration that deviates from the PCI order configuration when utilizing a PCI bus.

In still further embodiments, the prefetch command can indicate a block of memory to be stored to a level 2 cache (L2C), where the block of memory includes an address of the memory indicated by the second access request. To enforce the ordering rules, the control circuit may suspend the second access request (and/or subsequent access requests) when it determines that the first and second access requests match at least one of the rules for ordering access requests. The suspended access request(s) may be permitted upon detecting that the first access request is completed.

In yet further embodiments, the circuit may include a request buffer and a prefetch buffer. The request buffer and prefetch buffer may both receive the first and second access requests. When selecting an access request to send next, the control circuit may select from the request buffer and prefetch buffer based on the ordering rules, the type(s) of access requests in each buffer, a count of in-flight access requests, and/or other rules. To indicate the count of in-flight access requests, the circuit may also include one or more counters, each of which may be be specific to a given type of access request (e.g., read or write).

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments follows.

Figure 1:
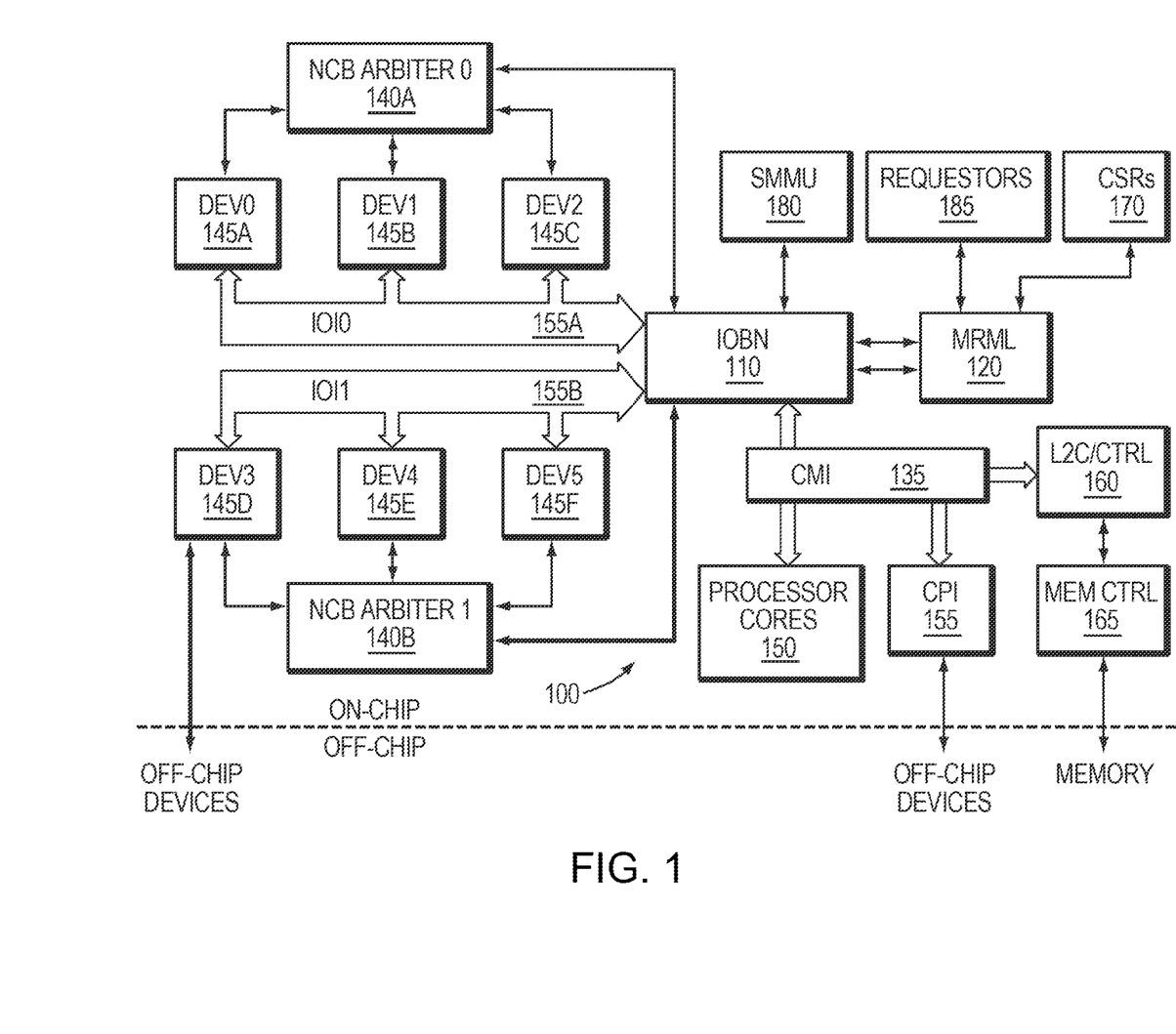
FIG. 1 is a block diagram illustrating a data processor in which embodiments of the present disclosure may be implemented.

FIG. 1 is a block diagram illustrating a data processor 100 in an example embodiment. The processor 100 may be implemented as a system-on-chip (SOC) and connected to external devices, resources and communications channels via a printed circuit board (PCB). Alternatively, the processor 100 may be implemented among a number of discrete circuit components connected via a PCB, or may comprise a SOC in combination with one or more discrete circuit components.

The data processor 100 facilitates operations between a number of devices and resources, and arbitrates access to shared resources among the devices. In particular, the processor cores 150 may include one or more data processor cores. In an example embodiment, the processor cores 150 may include a number (e.g., 48) of ARM® processor cores, such as the ARMv8 processor cores. The processor cores 150 are connected, via a coherent memory interconnect (CMI) 135, to provide shared access to a number of other devices and resources, including the level-2 cache (L2C) and controller 160 (also referred to herein as "L2C"). The L2C further connects to a memory controller 165 for performing memory access operations to an external memory, such as a double data rate synchronous dynamic random-access memory (DDR SDRAM) array. Such a memory (not shown) may alternatively be located on-chip with the data processor 100. The CMI 135 may also connect to a coherent processor interconnect (CPI) 155 for communication with off-chip devices, such as an additional data processor. An example of one such configuration is described below with reference to FIG. 2.

The CMI 135 is further connected to an input/output bridge (IOBN) 110, which provides an interconnect between the processor cores 150, CPI 155 and L2C 160 and additional devices and resources. In particular, devices 145A-F connect to the IOBN 110 via input/output interconnects (IOI), IOI0 155A and I0I1 155B, which may be non-coherent buses (NCBs) including passive and/or arbitrated channels. The devices 145A-F may include a number of different on-chip devices, such as co-processors, and may include I/O interfaces (e.g., USB, SATA, PCIe, Ethernet) to connect to a number of external or off-chip devices and interfaces. In order to arbitrate resources at the IOBN 110 to the devices 145A-F, NCB arbiters 140A-B receive requests from the devices 145A-F and selectively grant IOBN resources to the devices 145A-B. Once granted, the devices 145A-B may communicate with the processor cores 150, perform a memory access operation to the L2C 160, or access other components of the data processor 100.

In order to facilitate shared memory access among several different devices (e.g., the processor cores 150 and devices 145A-F), the data processor 100 may employ virtualization, whereby a memory interconnect (e.g., CMI 135 and IOBN 110) interfaces with the devices using virtual addresses, which are translated to a physical address of the memory. To enable virtualization, a System Memory Management Unit (SMMU) 180 maintains an index of physical and virtual addresses. During a memory access operation where a virtual address is provided, the IOBN 110 forwards the virtual address to the SMMU 180, which returns a corresponding physical address for accessing the memory (e.g., the L2C 160 or an external memory via the L2C 160). The IOBN 110 may translate addresses bi-directionally such that the virtual address is maintained at communications at the device, and the physical address is indicated in operations at the memory. The SMMU 180 may be further configured to support multiple tiers of virtual addresses.

Control status registers (CSRs) 170 include registers for maintaining information about the instructions and operations of the data processor 100. The CSRs may maintain, for example, status information regarding a number of devices, as well as information about ongoing operations and instructions between devices and/or resources. Devices such as the processor cores 150 and the devices 145A-B, as well as other requestors 185 and off-chip devices (via the CPI 155), may write to and read from the CSRs 170 using a register master logic (RML). To facilitate the multiple requests from several different devices, a master RML (MRML) 120 operates to arbitrate access to the CSRs 170.

Figure 2:
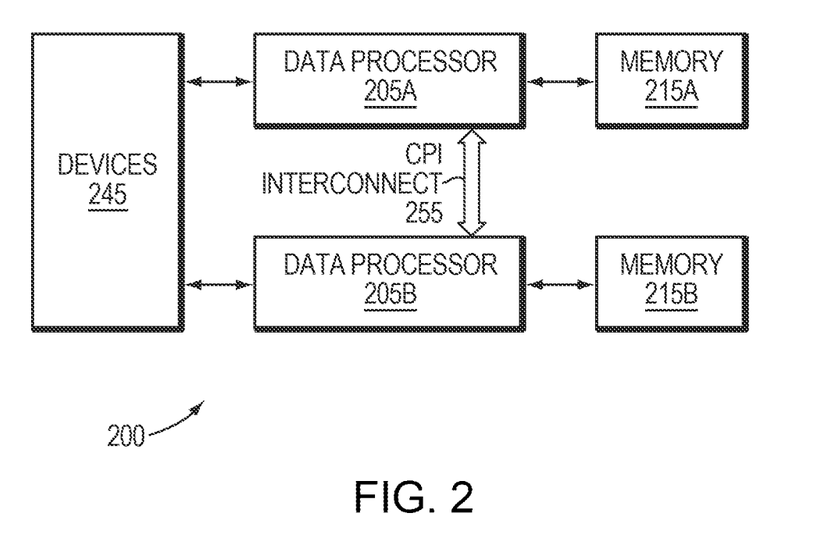
FIG. 2 is a block diagram illustrating a system implementing the data processor of FIG. 1.

FIG. 2 is a block diagram illustrating a system 200 implementing a plurality of data processors. The system 200 includes data processors 205A-B, each of which may be configured comparably to the data processor 100 described above with reference to FIG. 1. The data processors 205A-B may be linked by a CPI interconnect 255, which may connect to a respective CPI interface (e.g., 155 in FIG. 1) of each data processor 205A-B. The CPI interconnect 255 may provide shared access to the devices and resources across the data processors 201A-B. In further embodiments, additional data processors or other devices may be linked to the data processors 205A-B via the CPI interconnect 255.

The data processors 205A-B may be connected to respective memory arrays (e.g., DDR SDRAM) 215A-B as shown, and/or may be connected to a common memory array. The data processors may be further connected to a number of external devices 245 via a number of devices via respective I/O interfaces (e.g., USB, SATA, PCIe, Ethernet).

Turning back to FIG. 1, in some embodiments, the data processor 100 may implement certain interconnect or bus architectures, such as Peripheral Component Interconnect Express (PCIe), for communications at one or more interconnects (e.g., IOIs 155A-B, CMI 135). PCIe and other architectures typically operate using a predetermined set of rules for ordering access requests, such as memory reads and writes, to a memory (e.g., L2C 160). When enforcing ordering rules, some access requests are suspended until receiving an indication that a previous access request is completed. Under certain applications, enforcement of ordering rules can prevent conflicts between different access requests, for example by preventing out-of-order access to a common address of the memory. However, in other applications, such ordering rules may be unnecessary. For example, in applications where multiple processor cores and/or multiple other devices access a shared memory, the system may be otherwise configured to prevent memory access conflicts without the need for some or all ordering rules. Further, when an access request requires data to be fetched from another memory (e.g. a "cache miss" requiring retrieval from an off-chip SDRAM), the delay caused by this fetch may be exacerbated by enforcement of ordering rules.

In an example embodiment, the data processor 100 is configured to selectively enforce ordering rules according to a programmable register, as well as prefetch memory blocks for suspended memory access requests. In particular, the IOBN 110 enforces ordering of access requests according to a register storing an order configuration. When suspending an access request as a result of enforcing an order configuration, the IOBN 110 may also issue a prefetch command for the suspended access request, causing the L2C 160, via the memory controller 165, to retrieve a corresponding data block from an external memory. Subsequently, following the completion of a previous access request meeting the order configuration, the suspended access request is released. Due to the prefetch, the access request can be fulfilled with minimal delay.

An example IOBN 110 configured to provide the aforementioned functions is described below with reference to FIG. 3.

Figure 3:
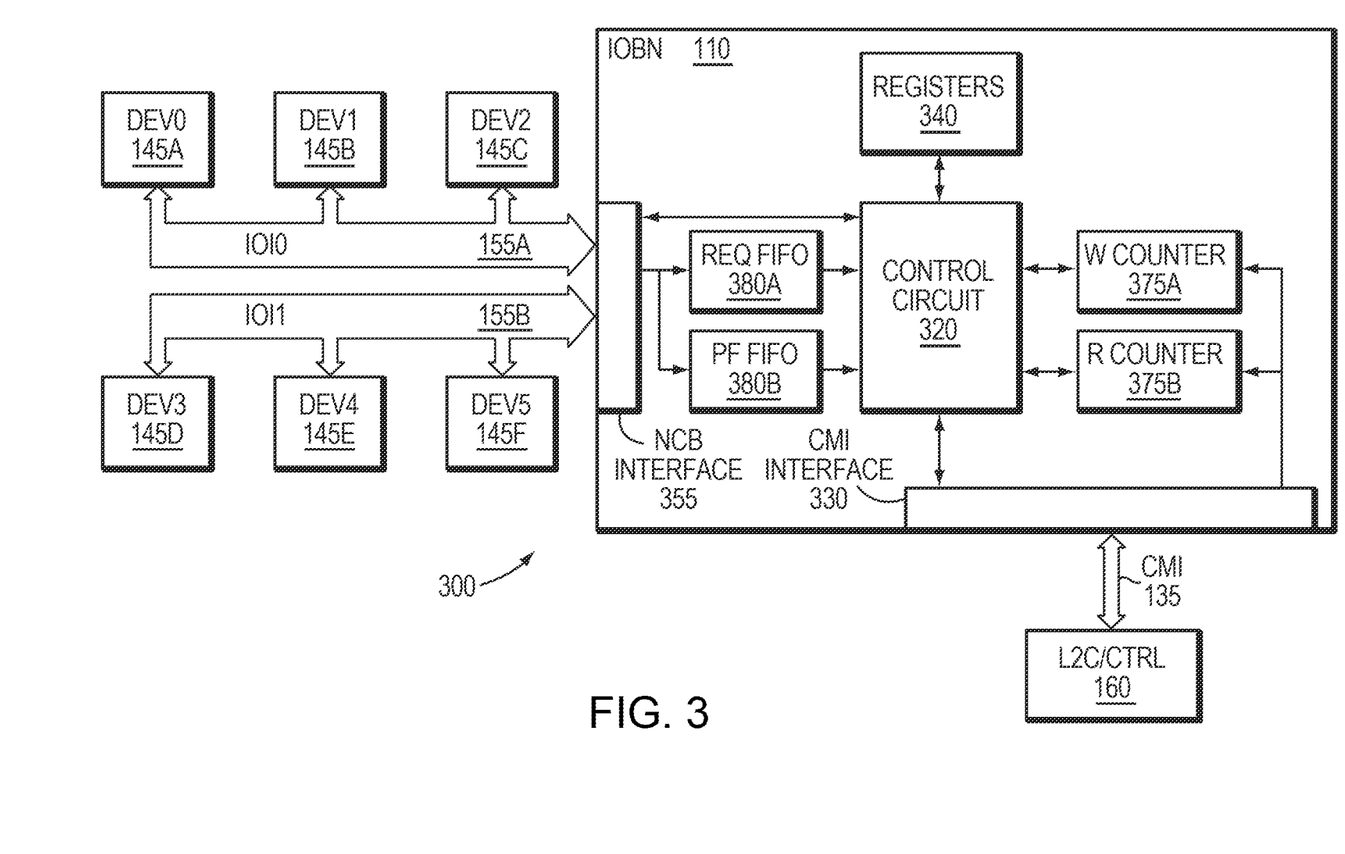
FIG. 3 is a block diagram illustrating an input/output bridge connecting a plurality of devices and a memory in one embodiment.

FIG. 3 is a block diagram illustrating a processing subsystem 300 including an IOBN 110 connecting a plurality of devices 145A-F and a memory (L2C 160) in one embodiment. The subsystem 300 may include one or more components of the data processor 100 described above with reference to FIG. 1, or may be incorporated into the data processor. For example, the subsystem 300 may also include processor cores 150 and process access requests from the processor cores 150 as well as from the devices 145A-F.

The IOBN 110 includes a non-coherent bus (NCB) interface 355 for communicating with the devices 145A-F via intermediary NCBs, 1010 155A and I0I1 155B. The IOBN 110 also includes a CMI interface 330 for communicating with the L2C 160 via the CMI 135. The IOBN 110 further includes a control circuit 320 and registers 340. Alternatively, the registers 340 may be located separately from the IOBN 110.

The devices 145A-F may forward memory access requests to the L2C 160 via the IOBN 110, for example to read or write to the L2C 160. The access requests may be received, in parallel, to both a request FIFO 380A and a prefetch FIFO 380B. The registers 340 store an order configuration, which indicates particular ordering rules to be enforced. An ordering rule indicates that a given access request of a particular type (e.g., read or write) must be completed before a subsequent access request of a particular type is sent. Alternatively, the order configuration may be stored to a register external to the IOBN 110, such as to CSRs 170 (FIG. 1). A write counter 375A and a read counter 375B maintain a count of pending or "in-flight" write requests and read requests, respectively. The counters 375A-B may be incremented by the control circuit 320 when the control circuit 320 forwards a corresponding request to the L2C 160, and may be decremented by an indication from the L2C 160 has completed a corresponding request.

The control circuit 320 may operate to 1) select a next access request, from one of the two FIFOs 380A-B, to send to the L2C 160, and 2) selectively suspend access requests based on the order configuration. The control circuit 320 may perform these operations based on a number of indications, including the number of entries in the request FIFO 380A and the prefetch FIFO 380B (and/or the relative difference between them), the values of the write and read counts as indicated by the counters 375A-B, the type of access request at the top of each FIFO 380A-B, and the order configuration. Example processes for selectively suspending and selecting access requests are described in further detail below with reference to FIGS. 5 and 6.

Figure 4A:
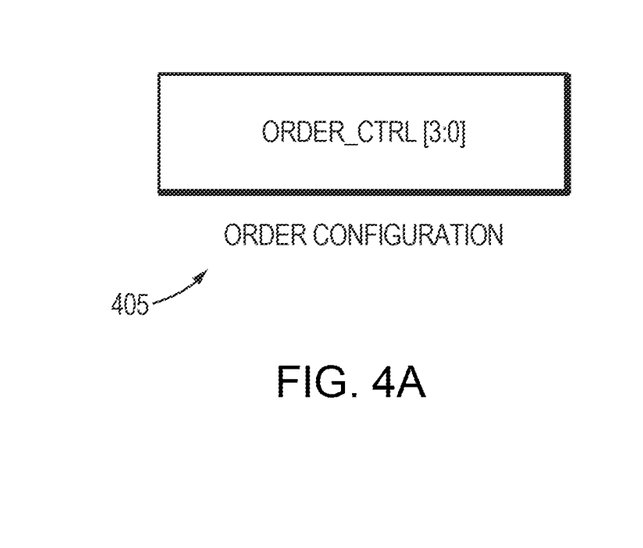
FIGS. 4A-B illustrate example order configuration structures.
Figure 4B:
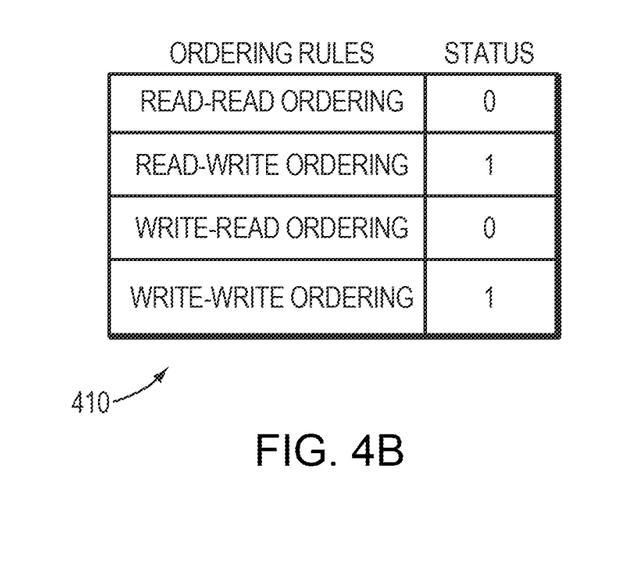

FIGS. 4A-B illustrate example order configuration structures 405. As shown in FIG. 4A, and order configuration 405, as stored to a register (e.g., register 340), may be a registry entry ("ORDER_CTRL") having a 4-bit value.

As shown in FIG. 4B, a table 410 articulates the particular ordering rules controlled by an order configuration. In a given order configuration, each ordering rule is either enabled ("1") or disabled ("0"). For example, with the "read-write ordering" rule enabled as shown in the table 410, a control circuit (e.g., control circuit 320 in FIG. 3) may enforce the rule by suspending a read request until all pending write requests. In contrast, with the "write-read ordering" rule disabled as shown in the table, the control circuit may disregard the status of previous read operations when determining whether to send a write request. In one embodiment, the order configuration may coincide with a PCIe order configuration, which is the example order configuration shown in the table 410. However, the order configuration may be to any other configuration, including when operating under a PCIe architecture.

Figure 5:
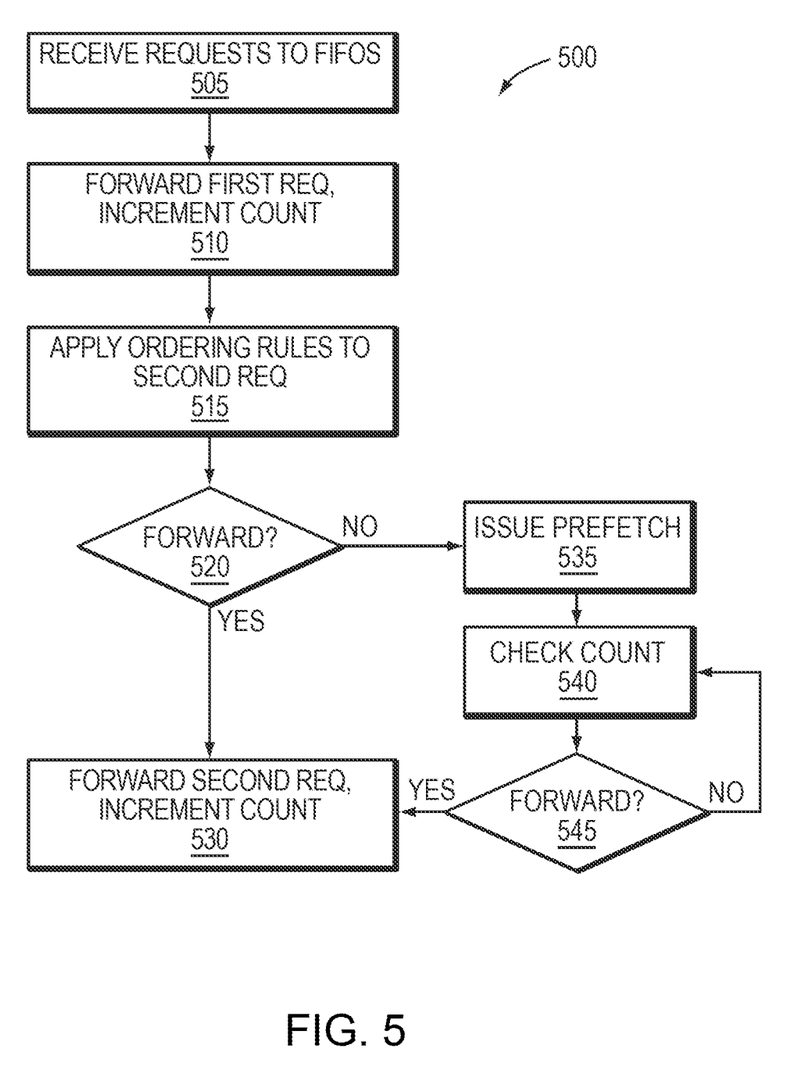
FIG. 5 is a flow chart illustrating processing of requests in one embodiment.

FIG. 5 is a flow chart illustrating a process 500 of enforcing an order configuration and issuing a prefetch one embodiment. The process 500 may be applied, in particular, to two subsequent access requests received to a bridge. With reference to FIG. 3, the IOBN 110 receives a first and a second request to the FIFOs 380A-B (505). Providing that the first access request conforms to an order configuration in view of previous requests, the control circuit 320 forwards the first request to the L2C 160, and increments a corresponding one of the counters 375A-B (510). While the first request is pending completion, the control circuit 320 applies ordering rules to the second request (515). (An example process of applying ordering rules is described below with reference to FIG. 6.) Based on the applicable rule(s) and status indicators (e.g., write count and read count as indicated by the counters 375A-B), the control circuit 320 determines whether to forward the second access request (520). If so, the control circuit 320 forwards the second request and increments a corresponding write or read count (530). If not, and the second request is instead suspended, the control circuit may issue a prefetch command to the L2C 160 (535). This prefetch command may instruct the L2C to retrieve a data block from another memory (e.g., an external SDRAM) pertaining to the second memory request, provided that the L2C 160 does not already store the data block. While the second request is suspended, the control circuit 320 may continuously or periodically check the write and/or read count to determine whether the second request may be forwarded in accordance with the order configuration (540, 545). If so, the control circuit 320 forwards the second request and increments a corresponding write or read count (530).

Figure 6:
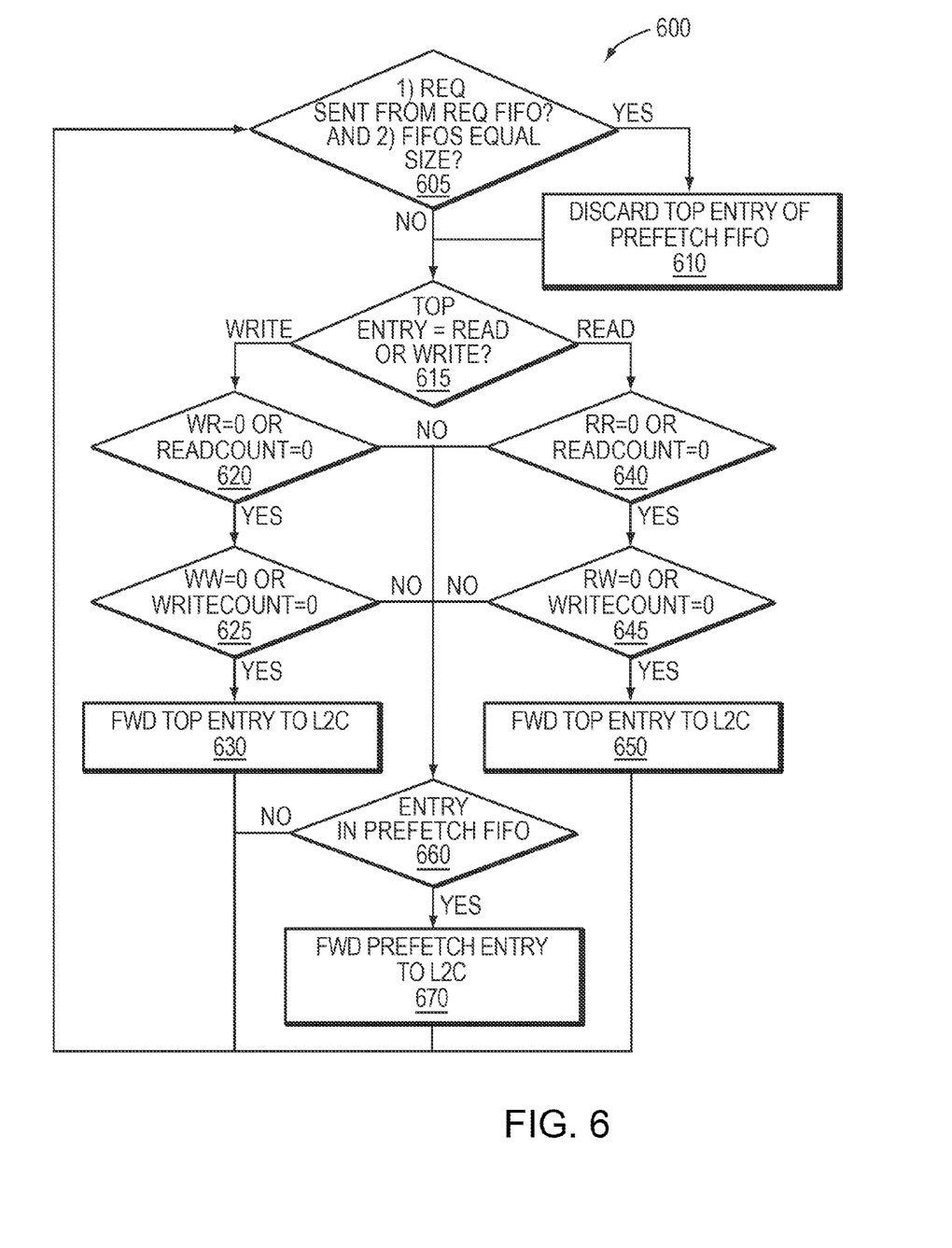
FIG. 6 is a flow chart illustrating a selection of a request in one embodiment.

FIG. 6 is a flow chart illustrating a selection of a request in an example embodiment. With reference to FIG. 3, The FIFOs 380A-B may contain a number of access requests. When determining a next request to send, the control circuit 320 first manages the FIFOs 380A-B. If a request from the request FIFO 380A was previously sent, then the control circuit 320 compares the number of entries in the two FIFOs 380A-B (605). If the FIFOs 380A-B have an equal number of entries, then the top entry of the prefetch FIFO 380B may be discarded to provide different access requests at the top of each of the FIFOs 380A-B (610).

The control circuit 320 then determines whether the top entry of the request FIFO 380A is a read request or a write request (615). If it is a write request, then the control circuit 320 applies ordering rules as follows: 1) the write-read ordering rule must be disabled, or the read count must be 0 (620); and 2) the write-write count must be disabled, or the write count must be 0 (625). If both requirements (1) and (2) are met, then the access request may be forwarded to the L2C (630), and the write count at the write counter 375A may be incremented.

Conversely, if the access request at the top of the request FIFO 380A is a read request, then the control circuit 320 applies ordering rules as follows: 1) the read-read ordering rule must be disabled, or the read count must be 0 (640); and 2) the read-write count must be disabled, or the write count must be 0 (645). If both requirements (1) and (2) are met, then the access request may be forwarded to the L2C (650), and the write count at the write counter 375A may be incremented.

If the access request fails to meet the above requirements, then the access request may be suspended while the control circuit 320 refers to the prefetch FIFO 380B (660). If there is an entry at the top of the prefetch FIFO 380B that conforms to the order configuration, then the prefetch access request is forwarded to the L2C 160 (670). The control circuit 320 may apply ordering rules to the prefetch access request as indicated above with respect to the top entry of the request FIFO 380A. Alternatively, the control circuit 320 may be configured to forward the top entry of the prefetch FIFO 380B independent of the order configuration, or may apply ordering rules that differ from the ordering rules applied to the entries of the request FIFO 380A.

While this invention has been particularly shown and described with references to example embodiments thereof, it will be understood by those skilled in the art that various changes in form and details may be made therein without departing from the scope of the invention encompassed by the appended claims.

What is claimed is:

1. A circuit for controlling access to a memory, comprising:
　　a register storing an order configuration, the order configuration indicating rules for ordering access requests;
　　a request buffer configured to receive first and second access requests;
　　prefetch buffer configured to receive the first and second access requests in parallel with the request buffer; and
　　a control circuit configured to:
　　forward the first access request to a memory;
　　monitor the completion status of the first access request;
　　selectively forward or suspend the second access request based on the order configuration and the completion status of the first access request; and in response to suspending the second access request, forward a prefetch command to the memory and forward a third request from the prefetch buffer to the memory.

2. The circuit of claim 1, wherein the order configuration indicates whether to enforce ordering among at least two sequential access requests based on a respective type of each of the at least two sequential access requests.

3. The circuit of claim 2, wherein the respective type includes at least one of a memory write request and a memory read request.

4. The circuit of claim 1, wherein the order configuration includes a Peripheral Component Interconnect (PCI) order configuration.

5. The circuit of claim 1, wherein the control circuit selectively forwards the first and second access requests via a PCI memory bus.

6. The circuit of claim 5, wherein the order configuration deviates from a PCI order configuration.

7. The circuit of claim 1, wherein the first and second access requests include at least one of a memory write request and a memory read request.

8. The circuit of claim 1, wherein the prefetch command indicates a block of memory to be stored to a level 2 cache (L2C), the block of memory including an address of the memory indicated by the second access request.

9. The circuit of claim 1, wherein the control circuit, in response to detecting that the first and second access requests match at least one of the rules for ordering access requests, suspends the second access request until detecting that the first access request is completed.

10. The circuit of claim 1, wherein the control circuit is further configured to select access requests from the request buffer and the prefetch buffer.

11. The circuit of claim 1, further comprising at least one counter configured to maintain a count of pending access requests, the control circuit selectively forwarding or suspending the second access request based on the count in addition to the order configuration and the completion status of the first access request.

12. A method of accessing a memory, comprising:
forwarding a first access request and a second access request to a memory;
storing the first and second access requests to a request buffer and a prefetch buffer in parallel;
monitoring the completion status of the first access request;
selectively forwarding or suspending the second access request based on an order configuration and the completion status of the first access request, the order configuration indicating rules for ordering access requests; and
in response to suspending the second access request, forwarding a prefetch command to the memory and forwarding a third request from the prefetch buffer to the memory.

13. The method of claim 12, wherein the order configuration indicates whether to enforce ordering among at least two sequential access requests based on a respective type of each of the at least two sequential access requests.

14. The method of claim 13, wherein the respective type includes at least one of a memory write request and a memory read request.

15. The method of claim 12, wherein the order configuration includes a Peripheral Component Interconnect (PCI) order configuration.

16. The method of claim 12, further comprising selectively forwarding the first and second access requests via a PCI memory bus.

17. The method of claim 16, wherein the order configuration deviates from a PCI order configuration.

18. The method of claim 12, wherein the first and second access requests include at least one of a memory write request and a memory read request.

19. The method of claim 12, wherein the prefetch command indicates a block of memory to be stored to a level 2 cache (L2C), the block of memory including an address of the memory indicated by the second access request.

20. The method of claim 12, further comprising, in response to detecting that the first and second access requests match at least one of the rules for ordering access requests, suspending the second access request until detecting that the first access request is completed.

21. The method of claim 12, further comprising selecting access requests from the request buffer and the prefetch buffer.

22. The method of claim 12, further comprising maintaining a count of pending access requests, the selectively forwarding or suspending the second access request being based on the count in addition to the order configuration and the completion status of the first access request.

* * * * *